United States Patent [19]

Hegendörfer

[11] Patent Number: 4,843,482
[45] Date of Patent: Jun. 27, 1989

[54] DEVICE FOR RECORDING SATELLITE TV BROADCASTS

[75] Inventor: Max Hegendörfer, Forchheim, Fed. Rep. of Germany

[73] Assignee: U.S. Philips Corporation, New York, N.Y.

[21] Appl. No.: 78,333

[22] Filed: Jul. 27, 1987

[30] Foreign Application Priority Data

Jul. 26, 1986 [DE] Fed. Rep. of Germany ....... 3625382

[51] Int. Cl.$^4$ .............................................. H04N 7/08
[52] U.S. Cl. .................................... 358/335; 455/231
[58] Field of Search ............... 455/150, 151, 171, 181, 455/231, 186, 66, 68, 170, 175, 177, 200, 230; 358/335, 142, 194.1, 191.1, 310, 349, 190; 340/825.22

[56] References Cited

U.S. PATENT DOCUMENTS 4,706,121  11/1987  Young ................................ 358/142

Primary Examiner—L. T. Hix
Assistant Examiner—David M. Gray
Attorney, Agent, or Firm—Marianne R. Rich

[57] ABSTRACT

A device for recording satellite television broadcasts comprises a satellite receiver for processing a satellite television signal, a video recorder for recording the satellite television signal, and a storage device which controls the video recorder and which stores the data of the broadcasts to be recorded. It is proposed to apply a control signal from the storage device to the satellite receiver briefly before the program to be recorded begins, which control signal switches the satellite receiver to the desired satellite program and, after termination of the broadcast to be recorded, to apply a further control signal which sets the satellite receiver from the switched-on condition to the stand-by mode or to a subsequent program to be recorded.

6 Claims, 1 Drawing Sheet

DEVICE FOR RECORDING SATELLITE TV BROADCASTS

The invention relates to a device for recording satellite-TV broadcasts, of a type as defined in the preamble of the appended claim 1.

Figure 1:
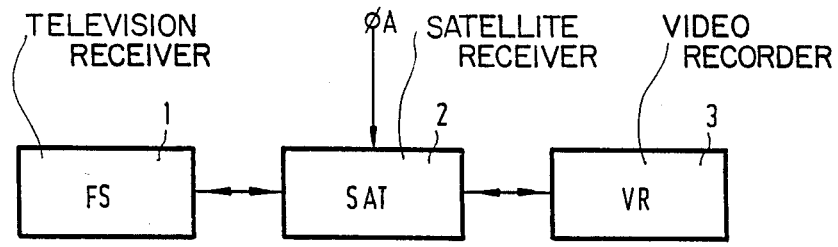
FIG. 1 is a circuit block diagram showing a prior art recording system.

Recently the number of television stations broadcasting their programs via satellites is constantly increasing. A more or less implicit consequence of this is the wish to record satellite television broadcasts on home video recorders. A known recording system is illustrated in FIG. 1 and operates as follows.

The data of a satellite television broadcast to be recorded (transmission source, such as for example modulator channel of the satellite receiver or AV socket, starting and end time, recording day) is entered in the video recorder 3 either by means of the keyboard, not shown, or by means of a remote-control unit (not shown). On the satellite receiver 2, the desired program number is selected manually by means of the keys (for example 1st program, 2nd program, ...). When the desired starting time is reached the video recorder 3 is switched on automatically and records the desired broadcast. Signal processing then proceeds in known manner: the satellite television signal received from the outdoor unit (microwave receiver incorporated in the parabolic aerial) and appearing on input A is applied to the satellite receiver 2 and after conversion in the video interface it is available on the AV socket (or Euro-AV socket). Of course, the signal can be made available simultaneously via a modulator incorporated in the satellite receiver. One of these output signals of the satellite receiver serves as the signal source for the video recorder (in the customary manner).

Such a recording system has the following drawbacks. When a satellite TV broadcast is to be recorded automatically, the user—before leaving the apparatus alone—must switch on the satellite receiver 2 and select the desired channel or the desired program. From this instant until the beginning of the desired program the apparatus operates in a normal operating mode and consumes an unnecessarily high amount of power. Moreover, automatically recording satellite broadcasts from different satellite transmitters or programs is not possible because this requires the satellite receiver 2 to be set manually to the new station (switching to another direction of polarisation, another audio standard, . . .), for example between the end of the first and the beginning of the second program to be recorded.

It is the object of the invention to construct a device of the type defined in the preamble of the appended claim 1 in such a way that television broadcasts from different satellite transmitters or programs can be recorded automatically without an unnecessarily high power consumption.

This object is achieved by means of the characteristic features as defines in the characterising part of the appended claim 1. Further advantageous embodiments are defined in the appended subsidiary claims.

Figure 2:
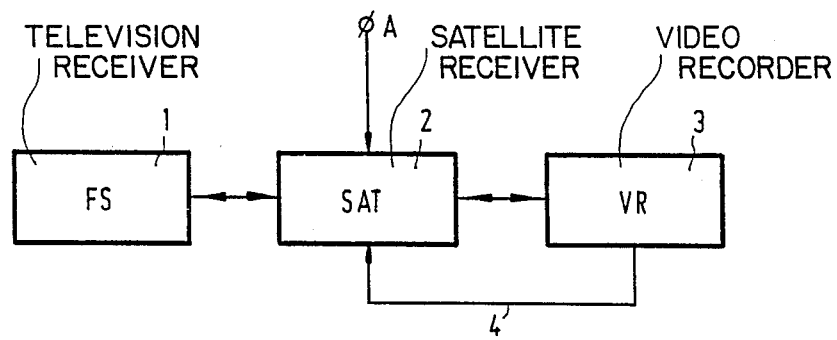
FIG. 2 is a circuit block diagram showing the recording system of the instant invention.

Embodiments of the invention and the advantages thereof will now be described in more detail, by way of example, with reference to FIG. 2.

First of all the data of the broadcasts to be recorded (program or channel numbers starting and end times, recording days) is entered into a storage device (not shown) by means of a remote-control unit (not shown) or by means of a keyboard (not shown). This storage device may be arranged in the remote-control transmitter, in the video recorder or in the satellite receiver itself. The satellite receiver 2—if it is not needed for direct viewing—and the video recorder 3 are set to stand-by. In this stand-by mode the power consumption of the satellite receiver 2 is substantially smaller than in the normal operating mode. Briefly before the beginning of the first satellite television broadcast to be recorded a control signal is applied from the storage device, which stores the data of the broadcast to be recorded and which in the present example is present in the video recorder 3, to the satellite receiver 2 to set the satellite receiver 2 from the stand-by mode to the normal mode of operation and at the same time select the desired program. This control signal may be applied either via a separate line 4 provided for this purpose (see FIG. 2) or via a signal connection which is present anyway, for example an IR connection, if the storage device is present in the remote control transmitter, or via the EuroAV socket of the video recorder.

When the broadcast to be recorded has ended the recording process is stopped automatically and the satellite receiver 2 is reset to stand-by (or to a subsequent program) by a further control signal from the storage device, which is applied in the same way as described in the foregoing. Briefly before the next program to be recorded begins the satellite receiver is again set from the stand-by mode to the normal mode of operation by a further control signal from the storage device and is thus ready for recording the next broadcast (which may be from another transmitter than the program recorded first).

In this way an automatic recording of two or more television broadcasts of different satellite programs after each other is possible without manual change-over of the satellite receiver and without the satellite receiver consuming an unnecessarily high power in the waiting period.

The device which is described may also be used when the satellite receiver 2 and a conventional television receiver 1 are combined to a single unit.

Further, the device in accordance with the invention can be used regardless via which connection sockets (AV socket, Euro AV socket, aerial input) of the satellite receiver 3, the television receiver 1 and the video recorder 3 the information signals to be recorded are applied.

Further, the present invention may be used directly in conjunction with a recording system operating in accordance with the known VPS standard.

What is claimed is:

1. A device for recording satellite TV broadcasts, comprising
    a satellite receiver for processing a satellite television signal,
    a video recorder for recording the satellite television signal, and
    a storage device which controls the video recorder, which device stores the data of the broadcast to be recorded.

Characterized in that before the beginning of the broadcast to be recorded a control signal is applied from the storage device to the satellite receiver (2), which control signal switches the satellite receiver (2) from a stand-by condition to a switched-on condition and to a desired satellite broadcast and after termination of the broadcast to be recorded a further control signal is applied to said receiver to switch the satellite receiver from the switched on condition to a stand-by condition or, if desired, to a subsequent broadcast to be recorded.

2. A device as claimed in claim 1, characterized in that the storage device is arranged in a remote-control transmitter.

3. A device as claimed in claim 1, characterized in that the storage device is arranged in the video recorder (FIG. 2).

4. A device as claimed in claim 1, characterized in that the storage device is arranged in the satellite receiver.

5. A device as claimed in claim 1, characterized in that the control signals are applied via a signal connection (4) provided for this purpose (FIG. 2).

6. A device as claimed in claim 1, characterized in that the control signals are applied via a signal connection which is present anyway.

* * * * *